United States Patent
Nishar et al.

[11] Patent Number: 6,036,449
[45] Date of Patent: Mar. 14, 2000

[54] AIR COMPRESSOR CONTROL

[75] Inventors: Dipchand V. Nishar; Thomas A. Dollmeyer; Christopher R. Nelson, all of Columbus, Ind.

[73] Assignee: Cummins Engine Company, Inc., Columbus, Ind.

[21] Appl. No.: 09/046,690

[22] Filed: Mar. 24, 1998

[51] Int. Cl.⁷ ............................. F02B 67/04; F04B 49/08
[52] U.S. Cl. ................................. 417/292; 417/307
[58] Field of Search ................. 417/53, 292, 307, 417/440; 180/53.8; 123/198 R

[56] References Cited

U.S. PATENT DOCUMENTS

| | | |
|---|---|---|
| 2,312,728 | 3/1943 | Hagan et al. . |
| 3,602,610 | 8/1971 | Bloom et al. . |
| 3,961,862 | 6/1976 | Edstrom et al. .................. 417/282 |
| 4,135,860 | 1/1979 | van Nederkassel ................ 417/12 |
| 4,149,827 | 4/1979 | Hofmann, Jr. . |
| 4,305,488 | 12/1981 | McIntosh . |
| 4,351,409 | 9/1982 | Malik . |
| 4,361,204 | 11/1982 | Earle . |
| 4,459,085 | 7/1984 | Tonegawa . |
| 4,478,304 | 10/1984 | Delano ............................. 180/165 |
| 4,756,669 | 7/1988 | Hata . |
| 4,863,355 | 9/1989 | Odagiri et al. . |
| 4,925,199 | 5/1990 | Hirmann . |
| 4,974,427 | 12/1990 | Diab . |
| 4,976,589 | 12/1990 | Ide . |
| 5,377,497 | 1/1995 | Powell . |
| 5,513,108 | 4/1996 | Kishimoto et al. . |
| 5,516,379 | 5/1996 | Schultz . |
| 5,576,962 | 11/1996 | Ferguson et al. . |
| 5,629,873 | 5/1997 | Mittal et al. . |
| 5,629,874 | 5/1997 | Mittal . |

FOREIGN PATENT DOCUMENTS

| | | |
|---|---|---|
| 0119505 A1 | 9/1984 | European Pat. Off. . |
| 0335086 A1 | 10/1989 | European Pat. Off. . |
| 0 470 459 A1 | 2/1992 | European Pat. Off. . |
| 1 503 437 | 5/1970 | Germany . |
| 27 17 224 | 10/1978 | Germany . |
| 52-28001 | 3/1977 | Japan . |
| 59-23089 | 2/1984 | Japan . |
| WO 98/07588 A1 | 2/1998 | WIPO . |
| WO 98/17493 A1 | 4/1998 | WIPO . |

Primary Examiner—Tony M. Argenbright
Assistant Examiner—Arnold Castro
Attorney, Agent, or Firm—Sixbey, Friedman, Leedom & Ferguson PC; Charles M. Leedom, Jr.; Donald R. Studebaker

[57] ABSTRACT

A system and method for air compressor control wherein the air compressor is loaded only when engine activities require it to be loaded or when free engine power is available to operate the compressor. An air compressor system is an engine-driven, piston-type compressor which operates in a loaded and an unloaded mode and provides air to a vehicle's air powered devices, such as service brakes, air suspension, windshield wipers, etc. The operating mode of the compressor is controlled by a pressure activated air governor which applies an air signal when pressure in a reservoir reaches a set level that activates a cap valve on an unloader stopping the air compressor. When the air pressure in the reservoir drops below a lower set pressure or when energy is "free," such as during downhill operations, the air governor exhausts the air signal allowing the air compressor to resume operation. Additionally, when the reservoir is of a pressure between the two set pressures and is in an unloaded state it will be maintained in that state for a set period of time to prevent rapid cycling of the air compressor. Further, when the reservoir is of a pressure between the two set pressures and is in a loaded state the air compressor will be unloaded after a set time interval that is based on a compressor head metal temperature to maintain threshold temperatures of the compressor head metal within a suitable range. Additionally, the compressor head is evaluated such that whenever the compressor head temperature exceeds a predetermined threshold temperature the air compressor is placed in an unloaded state until the compressor head temperature drops below the predetermined threshold temperature. The system is further capable of recording data indicative of compressor operation for detecting leaks in the air system and vehicle operator characteristics.

15 Claims, 2 Drawing Sheets

AIR COMPRESSOR CONTROL

TECHNICAL FIELD

The present invention relates generally to air compressor control in an internal combustion engine. More particularly, the present invention is directed to internal combustion engines incorporating air compressor control to increase engine efficiency.

BACKGROUND ART

Modern trucks contain air compressors which are used to charge an air tank from which air-powered systems, such as service brakes, windshield wipers, air suspension, etc., can draw air. In a typical trucking application, an air compressor can run in an unloaded state as much as 90% of the time. This high level of unloaded use results in using as much as 80% of air compressor fuel consumption during unloaded time and increased compressor head temperatures, reducing both fuel and engine efficiency. In an attempt to increase both fuel and engine efficiency, systems have been developed to reduce the amount of unloaded use of the air compressor and to reduce the amount of air compressor use during high energy use periods.

U.S. Pat. No. 2,312,728 issued to O'Hagan et al. a compressor control system is disclosed which activates a compressor when pressure in a reservoir drops below a first predetermined value, and deactivates the compressor when pressure in the reservoir reaches a second, higher predetermined value. However, the patent does not allow for optimal air compressor control by activating the air compressor when the tank pressure is between the predetermined values and the air compressor is in an unloaded state.

In an effort to overcome these shortcomings, U.S. Pat. No. 4,361,204 issued to Earle discloses a compressor used in a motor vehicle which is activated during downhill operation and while slowing and deactivated when climbing a hill or during periods of high energy use. While this increases the efficiency of a portion of the system, it does not optimize the efficiency throughout the air compressor cycle by activating the air compressor whenever the tank pressure falls below a predetermined value and deactivating the air compressor whenever the tank pressure surpasses another, higher predetermined value.

The prior art improves the efficiency of different portions of the air compressor cycle without optimizing the efficiency over the entire cycle of the air compressor and without controlling compressor head temperatures. Clearly, there is a need in the art for an air compressor control system which not only controls the air compressor in a manner which optimizes efficiency over the entire operating cycle, but one which also controls the compressor head temperature to prolong the operating life of the compressor.

SUMMARY OF THE INVENTION

A primary object of the present invention is to overcome the aforementioned shortcomings associated with the prior art.

A further object of the present invention to provide an actively controlled air compressor which results in a substantial improvement in fuel economy and engine performance.

Another object of the present invention is to provide for increased compressor life by actively controlling the air compressor to undergo periodic cooling cycles to maintain desirable head metal temperatures.

Yet another object of the present invention is to provide increased compressor life and increased vehicle performance by preventing excessive compressor cycling between loaded and unloaded modes.

A further object of the present invention is to provide for additional torque absorption for downhill braking procedures by operating the air compressor in a loaded mode during such procedures.

A still further object of the present invention is to provide for valuable information for service diagnostics by monitoring the duty cycle of the air compressor to identify unusual compressor activity. Also, such duty cycle monitoring can provide information regarding the operation of the vehicle in general.

An even further object of the present invention is to provide for control of an air compressor so that it cannot be operated when the compressor head temperature exceeds a predefined temperature.

These and other objects of the present invention are achieved by providing a system and method for air compressor control wherein the air compressor is loaded only when engine activities require it to be loaded or when engine power is available to operate the compressor. An air compressor system is an engine-driven, piston-type compressor which operates in a loaded and an unloaded mode and provides air to a vehicle's air powered devices, such as service brakes, air suspension, windshield wipers, etc. The operating mode of the compressor is controlled by a pressure activated air governor which applies an air signal when pressure in a reservoir reaches a set level that activates a cap valve on an unloader stopping the air compressor. When the air pressure in the reservoir drops below a lower set pressure or when energy is "free," such as during downhill operations, the air governor exhausts the air signal allowing the air compressor to resume operation. Additionally, when the reservoir contains a pressure between the two set pressures and is in an unloaded state it will be maintained in that state for a set period of time to prevent rapid cycling of the air compressor. Further, when the reservoir has a pressure between the two set pressures and is in a loaded state the air compressor will be unloaded after a set time interval that is based on a compressor head metal temperature to maintain threshold temperatures of the compressor head metal within a suitable range. Additionally, the temperature of the compressor head metal is monitored such that whenever the compressor head temperature exceeds a predetermined threshold temperature the air compressor is placed in an unloaded state until the compressor head temperature drops below the predetermined threshold temperature. The head temperature may be monitored in any manner such as a direct thermocouple reading or by way of other known and related engine operating parameters.

Particularly, the above aspects are achieved by providing an air compressor control system for controlling an onboard air compressor of a vehicle comprising an air compressor for providing compressed air to air powered devices of the vehicle, a sensor for sensing pressure of a reservoir containing compressed air and generating a signal indicative of the pressure and a control device for activating the air compressor when the signal generated by the sensor drops below a predetermined threshold value, corresponding to a predetermined threshold pressure, or when energy is available to run the air compressor. Similarly, the air compressor is deactivated when the signal generated by the pressure sensor reaches a second, predetermined threshold value, corresponding to a second predetermined threshold pressure. The first and second predetermined threshold pressures are preferably in a range of 50 psi to 150 psi and more preferable within the range of 90 psi to 120 psi.

The system is further controlled to deactivate the air compressor after a predetermined maximum loaded time corresponding to a predetermined compressor head temperature is reached to prevent excessive heating of the compressor head metal. Additionally, the control system maintains a given mode of the air compressor for a predetermined period of time when the air compressor is operating between the predetermined threshold pressures to prevent excessive cycling of the air compressor.

The system for controlling an air compressor includes the steps of sensing a pressure of a reservoir containing compressed air supplied by an air compressor, generating a signal indicative of the pressure and transmitting the signal to a control unit for controlling the air compressor. Activating the air compressor when the signal falls below a first predetermined value corresponding to a first predetermined threshold pressure or activating the air compressor when energy is available and deactivating the air compressor when the signal reaches a second predetermined value corresponding to a second predetermined threshold pressure. Once again, the particular method set forth herein results in the controlling of an air compressor such that the air compressor is deactivated after a predetermined maximum loaded time corresponding to a predetermined compressor head metal temperature to prevent excessive heating of the compressor head metal as well as a method wherein a given mode of the air compressor is maintained for a predetermined period of time when the air compressor is operating between the predetermined pressures to prevent excessive cycling of the air compressor.

These, as well as additional objects out of the present invention, will become apparent from the following detailed description of the present invention when read in light of the several figures.

DETAILED DESCRIPTION OF THE PRESENT INVENTION

Figure 1:
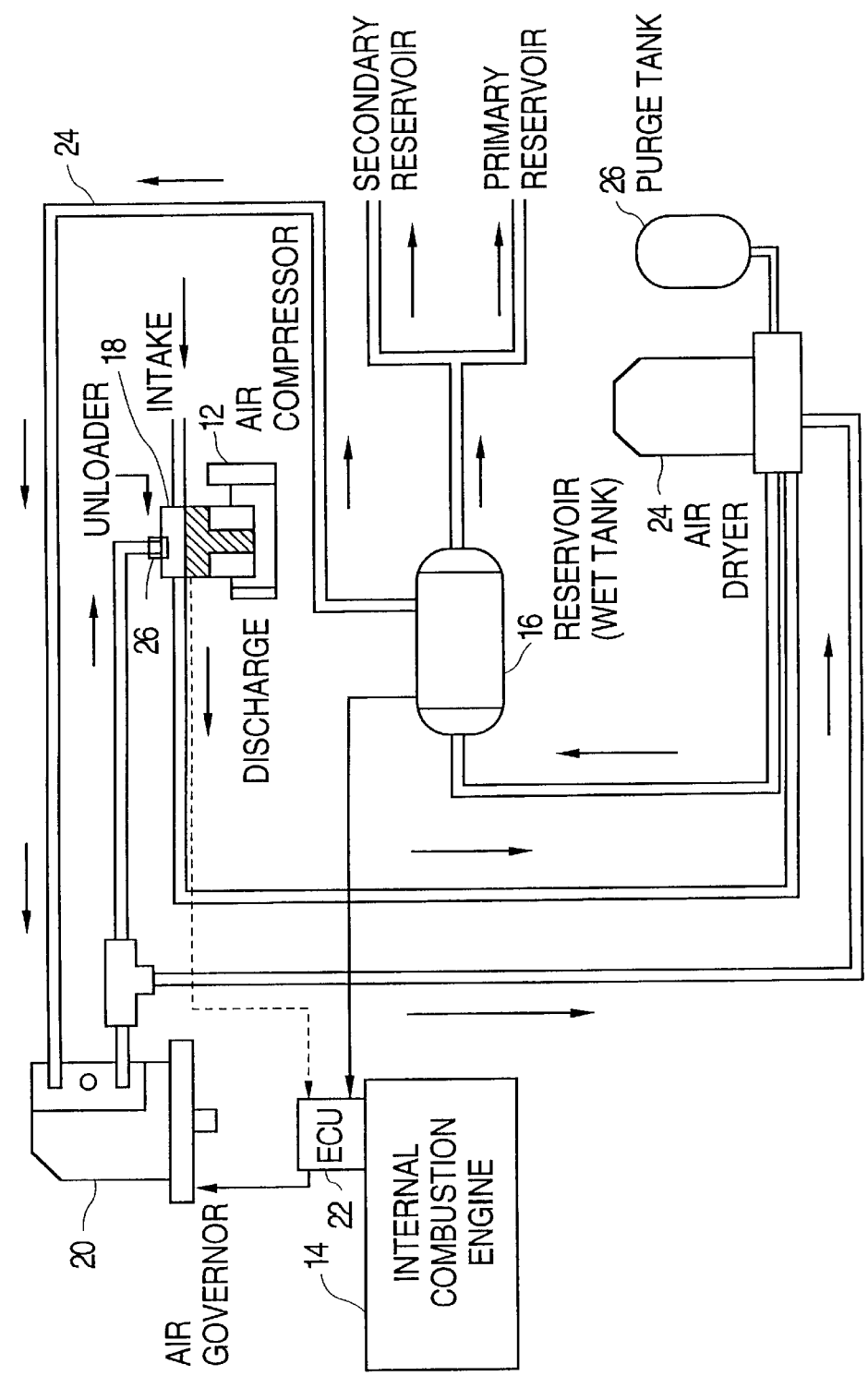
FIG. 1 is a schematic illustration of an air compressor subsystem which is controlled in accordance with the present invention.

In typical over the road hauling vehicles, an onboard air compressor provides air to the vehicle's air powered devices such as service breaks, air suspension, windshield wipers, etc. A majority of air compressors on such over the road vehicles are engine driven, piston type compressors. Such compressors run whenever the engine is running, however, these compressor have two modes of operation, that being an operation during the loaded and unloaded states. The operating mode is controlled by a pressure activated air governor and an unloader associated with the air compressor. As can be seen from FIG. 1, which illustrates an air compressor system which utilizes the control system in accordance with present invention includes an air compressor 12 which is driven by way of a crankshaft of an internal combustion engine 14. The air compressor 12 is utilized to maintain a pressure within a wet tank or reservoir 16 within maximum and minimum pressure limits. In accordance with the present invention, a maximum pressure limit may be in the range of 150 psi while a minimum may be in the range of 50 psi. Preferably, this range is from 90 psi to 120 psi.

As noted hereinabove, the operating mode of the air compressor is controlled by an unloader 18 and air governor 20 in a conventional manner. The subject of the present invention is the particular control of the unloader 18 and governor 20 so as to control the unloaded and loaded operational mode of the compressor so as to advantageously affect the fuel consumption of the internal combustion engine as well as advantageously utilize other attributes of the air compressor in operating the over the road vehicle while prolonging the useful life of the air compressor.

Control of the air compressor is carried out by the air governor 20 which is in turn managed by electronic control unit 22, the particular operation of which will be discussed in greater detail hereinbelow. Additionally, the system includes an air dryer 24 and purge tank 26 which likewise operate in a conventional manner. It is of particular importance that the air pressure within the reservoir 16 be maintained within the optimum limits in a manner which also maintains optimum operating efficiency of the engine. In operation, as with conventional air compressor subsystems, when the air system reaches cut out pressure, as indicated by the air return line 24 from the reservoir 16, the air governor 20 applies an air signal to the unloader 18. This activates the unloaders cap valve 26 which stops compressed air from flowing into the air system. When the air pressure in the reservoir 16 drops to or below the cut in pressure, the air governor 20 exhausts the air signal to the unloader assembly. This allows the compressor to resume pumping air into the air system as a whole and subsequently the reservoir 16.

As noted hereinabove, it is a primary object of the present invention to minimize head metal temperatures of the air compressor 12. That is, compressed air leaves the air compressor at an elevated temperature which may be in the range of 250°–600° F. Consequently, it is desirable to have sufficient and periodic cooling cycles so as to prolong the compressor life. This aspect of the present invention will be discussed in greater detail hereinbelow.

Once the compressed air leaves the air compressor, it is directed to the air dryer 24 where the temperature drops to less than 150 degrees fahrenheit. As with most conventional air systems, the dryer primarily functions as a desiccant which removes moisture from the compressed air. This prevents downstream freeze ups and corrosion of the air lines, air tanks and valving components. The dryer also functions as a sump for oil and air contaminants which in effect increases the system life. From the dryer, the compressed air is supplied to the wet tank or reservoir 16. As with most systems, the reservoir includes a safety valve which typically pops open at pressures above 150 psi so as to eliminate the possibility of the reservoir 16 becoming overloaded. This reservoir 16 then supplies pressurized air to any number of primary and secondary reservoirs which are dictated by vehicle air needs. For safety reasons, the primary and secondary air reservoirs include one-way check valves which prevent reverse flow of air back to the reservoir 16. This insures that even if the air compressor fails, the vehicle will have some residual air pressure in order to operate the braking system.

Again, as noted hereinabove, it is a primary object of the present invention to prolong the air compressor life to the fullest extent possible while at the same time maximizing the fuel efficiency of the engine.

One of the main factors affecting air compressor life is high temperatures as was previously noted hereinabove. In accordance with the present invention, by controlling the length of the compressor load cycle as well as the frequency of compressor load cycles, the head temperature can be reduced. In studies, it was found that about 85% of the air compressor cycles are less than one minute in duration. Typically, the load cycles are longest during engine start-ups after the extended down time, however, under these conditions, the engine is cool and thus the cooling system can keep the air compressor sufficiently cool. It is during other idling events where head temperatures are of concern. That is, the head temperature can be quite high during operational idling because the cooling system is being stressed by other components of the engine. A relationship between the compressor head metal temperature and other engine operating factors has been determined. Particularly, effort has been made to characterize the compressor head metal temperature of the compressor as a function of intake manifold temperature, compressor speed, boost pressure, wet tank pressure and coolant temperature. With these variables, which are already supplied to the electronic control unit of the engine, formulated so as to provide an indication of the compressor head metal temperature, control of the loading and unloading of the air compressor based on such parameters can be achieved.

As noted hereinabove, the head metal temperature of the compressor may be characterized as a function of the intake manifold pressure, compressor speed, boost pressure, wet tank pressure and coolant temperature.

In that it is an object of the present invention to reduce air compressor head metal temperatures and thus increase the overall life of the air compressor, the above-noted parameters can be monitored to determine the optimum compressor operation cycle time. Additionally, with the reduction in air compressor head metal temperature, and consequently short compressor cycles, the air dryer efficiency is increased which may result in the use of lighter weight dryers or an increase in the desiccant life of present dryers.

The air compressor can absorb as much as 6–8 horsepower during downhill vehicle operation while loaded which aids in braking of the vehicle. Clearly, it is favorable to run the air compressor in the loaded mode during downhill operations for several reasons. During the downhill operation, energy is "free". That is fuel consumption is not affected by the loaded state of the air compressor. Secondly, engine torque is being absorbed by the air compressor which is of benefit to the braking of the engine. This is particularly advantageous for vehicles which are not equipped with compression breaks and hence rely solely on service brakes for absorbing torque. And thirdly, by operating the air compressor above its "normal" cut in pressure, and possibly going over its "normal" cut out pressure (as will be discussed in greater detail hereinbelow), it is possible to create an additional braking buffer for the operator. This is particularly advantageous to an operator travelling on a long downgrade where it is frequently necessary to periodically pump the brakes while observing the air pressure for fear of losing the service brakes due to a depletion of the air supply.

Additionally, it is important that the system minimize sudden operation of the air compressor when the vehicle is idling which can cause dips in the engine idle speed which in turn can cause instability with a marginally stable governor. Further, with the present system engine performance during short term, high powered transients is improved because the air compressor is kept in the unloaded state during such high powered transients. By ensuring that the compressor is loaded only when absolutely necessary or when energy is "free" an optimum balance between performance and fuel economy is achieved.

The particular control system of the present invention will now be discussed in greater detail, with the control system being particularly designed to fulfill five major objectives. The first being reduce fuel consumption necessary to operate the air compressor. Second, to reduce air compressor operation impact on vehicle performance, that is the amount and rate of change of torque delivered to the drive train of the vehicle. Third, to make the air compressor operate as a torque absorber. Fourth, to increase the life of the air compressor by regulating air compressor cycle time and fifth, to monitor parameters such as air compressor duty cycle, cycle time, wet tank pressure and service break events to aid in the diagnosis of air leaks and unusual braking patterns.

The air compressor control system in accordance with the present invention utilizes data found in the engine electronic subsystem, with this subsystem deciding when it is economical to run the air compressor. The subsystem further decides when it is necessary to increase torque absorption and when it is necessary to provide more torque or rapid change in torque. Because this information is necessary to the operation of other components of the engine, this information is a global property of engine operation and is provided by the electronic control unit. The air pressure control subsystem in particular will decide when the compressor must run, when it must not run and when conditions are such that it may either run or not run. The decision is made to insure that the primary function of the air compressor is not compromised however decisions will be made so as to optimize fuel efficiency and engine operations. The latter information is a local property of the air compressor operation but is also available to the global engine electronic subsystem.

As noted hereinabove, the air compressor control subsystem determines when the air compressor must run, that is, be in the loaded state (state R in the table below), must not run, that is, be in the unloaded state, (state N in the table below) or when the engine operating conditions are indifferent as to whether or not the air compressor is in the loaded or unloaded state (state O in the table below). The air compressor must run in the loaded state to fulfill its function, state R. That is, when the wet tank pressure drops below a predetermined minimum threshold pressure. This minimum threshold pressure may be in the range of 50 psi to 150 psi and is preferable in the range of 90 psi to 120 psi. It is noted, however, that once the tank pressure has reached 110 psi, the compressor state will not return to a loaded state until the pressure actually drops below 90 psi. This 20 psi band insures that noise in the air line does not cause unnecessary pumping cycles. Another air compressor state is a state where the air compressor must run in an unloaded state, state N. This condition is met when the wet tank pressure is greater than or equal to a maximum threshold pressure. This pressure being in the range of 100 psi to 150 psi and preferable approximately 135 psi. This is to insure that the air pressure does not exceed the safety limits of the reservoir.

When the compressor is not in either of the above noted states, it is in a state where it is OK to run the air compressor in a loaded mode, if necessary, and it is OK not to run the air compressor in the loaded state if necessary, state O. This is the case where the air pressure within the reservoir is between the minimum threshold pressure and the maximum threshold pressure, that is between 50 psi and 150 psi and more preferable between 90 psi and 120 psi.

As noted hereinabove, engine operating conditions dictate whether the air compressor is run in a loaded state during the air compressor state where it is indifferent as to whether or not the air compressor is operated. Particularly, one such engine operating state may be an engine condition when it is economical to run the air compressor, such as a motoring condition (state E) while another state denotes situations when it is actually beneficial to absorb as much torque from the engine as possible for e.g. when the vehicle is going down a long grade and the operator has to engage the brakes to keep the vehicle speed in control (state A). The state E referred to hereinabove is a subset of state A and is inclusive in such state A. Consequently, whenever state A is applicable, state E is applicable as well. Another operating state is a state D which is a state of the engine whenever it is not in the one of state E or state A. Or better stated, when it is not in state A in that state A is inclusive of state E. One particular state wherein state D is clearly applicable is during high power transients. The following table better illustrates when the compressor is operated in the loaded and unloaded condition for various engine states.

TABLE

| COMPRESSOR | ENGINE STATE | | |
|---|---|---|---|
| STATE | E | A | D |
| R | Loaded | Loaded | Loaded |
| N | Unloaded | Unloaded | Unloaded |
| O | Loaded | Loaded | Unloaded |

Accordingly, this table makes clear that when the reservoir pressure falls below a predetermined minimum threshold pressure, the compressor must run in the loaded state, state R, while the compressor must not run in the loaded state when the pressure within the reservoir is greater than a predetermined maximum threshold pressure, state N. However, in order to maximize engine efficiency, it is critical to control the loading and unloading of the air compressor during the time when the air pressure within the reservoir is greater than the minimum threshold pressure and less than the maximum threshold pressure, state O. To accomplish this, when the compressor is in the "O" state and the compressor is in an unloaded mode of operation, the air compressor will be maintained in that state for a predetermined time period, on the order of 10 to 20 seconds and preferably 15 seconds in the event of a change of operational state from the unloaded to loaded. After that time, the air compressor will assume the state mandated by the above decision matrix. This condition will prevent rapid cycling of the compressor in the event that the engine state changes rapidly, i.e. between E and D which may occur in a hilly region. Additionally, in that it is a primary object of the present invention to extend the life of the compressor, the control system will restrict the time that the air compressor runs in the loaded mode when the compressor state is "O". The compressor will be unloaded based on the calculated value of the compressor head metal temperature, this being discussed in greater detail hereinbelow. In this regard, the air compressor will be unloaded whenever the head metal temperature exceeds a calibrated threshold value and the compressor is operated in the "O" state. That is, when the compressor state is "O" and the decision matrix mandates that the compressor should be in a loaded condition, the air compressor will run in the loaded mode until the head temperature exceeds a predetermined threshold. After that, the air compressor will run in an unloaded mode for a predetermined period of time on the order to 20 to 40 seconds and preferably 30 seconds. At the end of this predetermined time period, the air compressor will run as dictated by the decision matrix. The "cool down" period aids in lowering the operating temperatures of the air compressor and consequently prolongs the compressor life. It should also be noted that the cooling down period will not kick in unless the compressor is in the "O" state. Thus, the driver will not experience pump-up delays when the vehicle is first started after a prolonged shut down since the compressor state will be in a mode where the reservoir pressure will be less than the predetermined minimum threshold value.

The above-noted automatic control system for an air compressor for use in an internal combustion engine in accordance with the present invention was tested following several different route configurations. The results of one of such routes are set forth in FIG. 2.

An initial test route was considered a "bread and butter" route. This route was a mixed route wherein the vehicle experienced city driving, some amount of driving at moderate speed and some amount of hilly terrain. The round trip took approximately two hours. The second route was intended as a longer version of the initial route. This route included driving from over an extended period of time over interstate highways as well as city driving. This route provided stop and go driving, fair sized hilly grades and interstate driving. The round trip takes approximately four hours. In yet another route, a large number of stop and go situations were experienced on a route that takes approximately three hours and ultimately a day long route taking approximately eight hours on an interstate was carried out. This route was designed to emulate the normal driving terrain of a class 8 long haul vehicle on the interstate system.

These routes were set up so that they would provide an opportunity to assess the prototype performance under various traveling conditions. Besides testing the concept on these routes, the prototype was deployed on an over the road heavy duty vehicle which traveled from Indiana to Utah.

Figure 2:
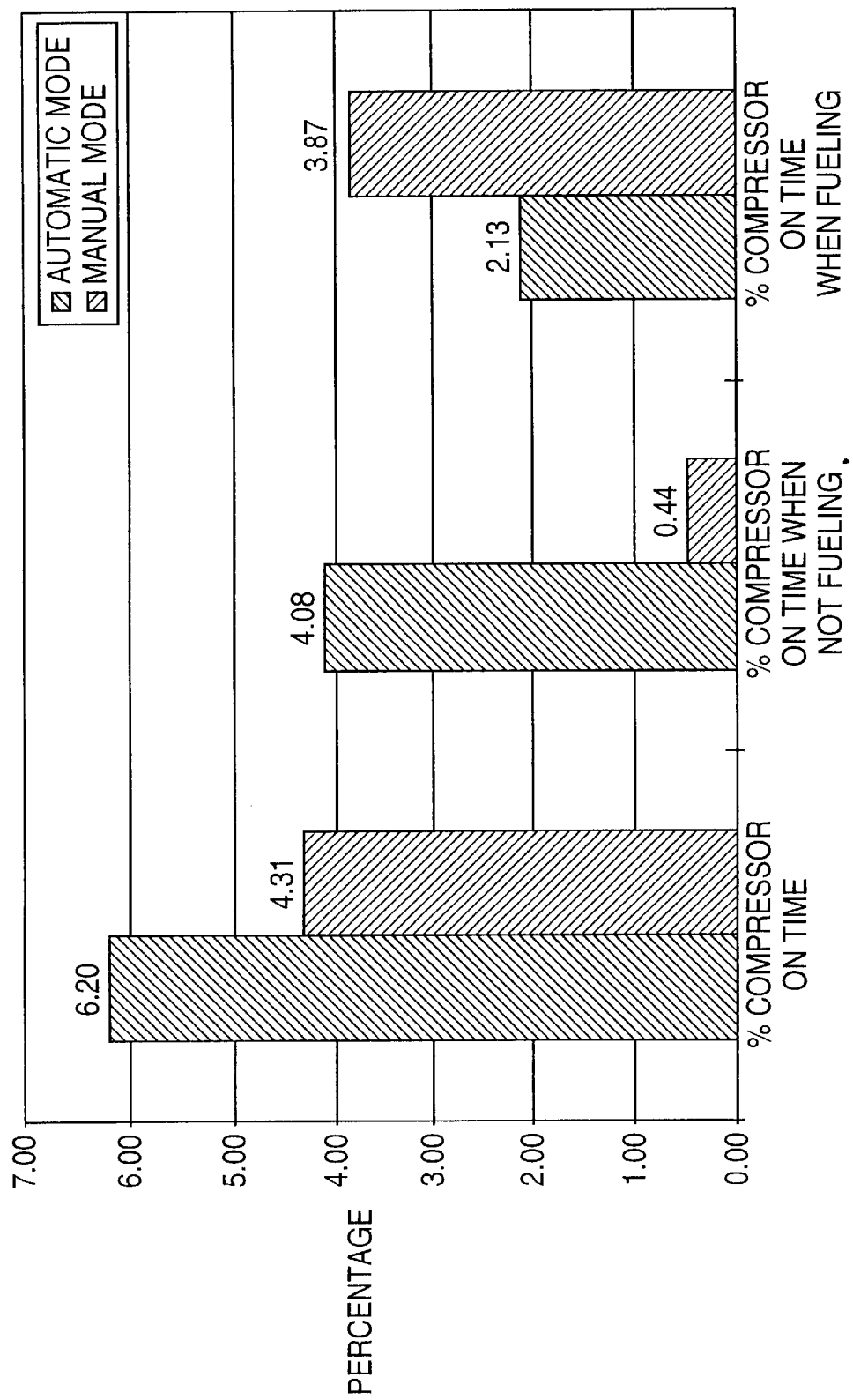
FIG. 2 is a graphic illustration of the economic operation of an air compressor controlled in accordance with the present invention.

As can be seen from FIG. 2, the fuel consumption during the automatic mode of the air compressor operation is 45% less than that during the manual mode of operation. This was achieved despite the fact that the air compressor runs more when in the automatic mode as can be appreciated from FIG. 2. That is, the first set of bars in FIG. 2 show that the compressor on time is approximately 6.2% when in the automatic mode as compared to 4.31% when in the manual mode. However, when in the automatic mode, 4.08% of the time was carried out when the engine is not fueling as compared to 0.44% when in the manual mode. Similarly, the compressor on time when fueling is 2.13% when in the automatic mode as compared to 3.87% when in the manual mode. Clearly, this results in a significant reduction in fuel consumption by the air compressor.

In addition to the foregoing, analysis of data such as duty cycle of the compressor, length of cycles, total compressor pump operating time and reservoir pressure change rates, all parameters which can be readily derived from the ECU can provide valuable information relating to service diagnostics for warranty purposes. By monitoring the duty cycle of the air compressor, unusual activities indicating air leaks in the compressed air system can be identified. Leaks in the vehicles air system can cause the air compressor to run more often than necessary and for longer periods of time. This reduces fuel economy and increases the overall power consumption of the air compressor rendering the vehicle more expensive to operate.

In addition to service diagnostics, vehicle operating characteristics can be ascertained from this data which can also be beneficial for warranty purposes. By monitoring the above-noted parameters braking habits of the vehicle operator can be assessed. Because faulty brakes are the most common reason a vehicle is placed out of service by the Department of Transportation, and the servicing of brakes is quite expensive, it is beneficial for a fleet operator to have some means for quantifying the driving profiles of its drivers. Moreover, drivers who are aware that their fleet operator has such a means for quantifying the characteristics of their driving, they will be less likely to abuse the vehicle.

Accordingly, by controlling the operation of the air compressor in the manner set forth hereinabove, air compressor operation which reduces the fuel used to operate the air compressor, a reduction in the air compressor's impact on vehicle performance, the use of the air compressor as a torque absorber and an increase in the life of the air compressor by regulating compressor cycle time and minimizing head metal temperatures of the compressor is achieved. That is, by operating the compressor only when absolutely necessary or when energy is "free" in the manner set forth hereinabove results in an operation of an air compressor which is beneficial to the overall performance of the engine as well as one which increases the useful life of the compressor. Moreover, service diagnostics and operator control are greatly improved by reviewing data already provided to the system such as duty cycle, length of cycles, total pump time and reservoir pressure change rates.

While the present invention has been described with reference to a preferred embodiment, it will be appreciated by those skilled in the art that the invention may be practiced otherwise than as specifically described herein without departing from the spirit and scope of the invention. It is, therefore, to be understood that the spirit and scope of the invention be limited only by the appended claims.

We claim:

1. An air compressor control system for controlling an onboard air compressor of a vehicle, comprising:
   an air compressor for providing compressed air to air powered devices of the vehicle;
   a sensing means for sensing pressure of a reservoir containing compressed air and generating a signal indicative of said pressure; and
   a control means for activating said air compressor when said signal drops below a first predetermined threshold value, corresponding to a first predetermined threshold pressure, or when energy is available to run said air compressor and deactivating said air compressor when said signal reaches a second, predetermined threshold value, corresponding to a second, predetermined threshold pressure,
   wherein said control means deactivates said air compressor after a predetermined maximum loaded time corresponding to a predetermined compressor head metal temperature to prevent excessive heating of said compressor head metal.

2. The air compressor control system of claim 1, wherein said first and second predetermined threshold pressures are in a range of 50 and 150 psi.

3. The air compressor control system of claim 1, wherein said first and second predetermined threshold pressures are in a range of 90 to 120 psi.

4. The air compressor control system of claim 1, wherein said control means maintains a given mode of said air compressor for a predetermined period of time when said air compressor is operating between said predetermined pressures to prevent excessive cycling of said air compressor.

5. The air compressor control system of claim 1, wherein said control means activates said air compressor when the vehicle is in downhill operation.

6. The air compressor control system for controlling an onboard air compressor of a vehicle comprising:
   an air compressor for providing compressed air to air powered devices of the vehicle;
   a sensing means for sensing pressure of a reservoir containing compressed air and generating a signal indicative of said pressure; and
   a control means for activating said air compressor when said signal drops below a first predetermined threshold value, corresponding to a first predetermined threshold pressure, or when energy is available to run said air compressor and deactivating said air compressor when said signal reaches a second, predetermined threshold value, corresponding to a second, predetermined threshold pressure,
   further comprising a means for recording data regarding operating characteristics of said air compressor.

7. The air compressor control system for controlling an onboard air compressor of a vehicle comprising:
   an air compressor for providing compressed air to air powered devices of the vehicle;
   a sensing means for sensing pressure of a reservoir containing compressed air and generating a signal indicative of said pressure; and
   a control means for activating said air compressor when said signal drops below a first predetermined threshold value, corresponding to a first predetermined threshold pressure, or when energy is available to run said air compressor and deactivating said air compressor when said signal reaches a second, predetermined threshold value, corresponding to a second, predetermined threshold pressure,
   further comprising temperature sensing means for sensing a compressor head temperature and generating a signal indicative of said compressor head temperature.

8. The air compressor control system of claim 7, wherein said control means deactivates said air compressor when said temperature sensing means generates a signal indicating that said compressor head temperature is above a predetermined threshold temperature.

9. A method for controlling an air compressor, comprising:
   sensing a pressure of a reservoir containing compressed air supplied by an air compressor;
   generating a signal indicative of said pressure and transmitting said signal to a control means for controlling the air compressor;
   activating said air compressor when said signal falls below a first predetermined value, corresponding to a first predetermined threshold pressure activating said air compressor when energy is available;
   deactivating said air compressor when said signal reaches a second, predetermined value, corresponding to a second, predetermined threshold pressure; and
   deactivating said air compressor after a predetermined maximum loaded time corresponding to a predetermined compressor head metal temperature to prevent excessive heating of said compressor head metal.

10. The method for controlling an air compressor of claim 9, wherein said first and second predetermined threshold pressures are in a range of 50 to 150 psi.

11. The method for controlling an air compressor of claim 9, wherein said first and second predetermined threshold pressures are in a range of 90 and 120 psi.

12. The method for controlling an air compressor of claim 9, further comprising the step of maintaining a given mode of said air compressor for a predetermined period of time when said air compressor is operating between said predetermined pressures to prevent excessive cycling of said air compressor.

13. The method for controlling an air compressor of claim 9, further comprising the steps of mounting the compressor on board a vehicle and of activating said air compressor when the vehicle is in downhill operation.

14. The method for controlling an air compressor comprising:

sensing a pressure of a reservoir containing compressed air supplied by an air compressor;

generating a signal indicative of said pressure and transmitting said signal to a control means for controlling the air compressor;

activating said air compressor when said signal falls below a first predetermined value, corresponding to a first predetermined threshold pressure activating said air compressor when energy is available;

deactivating said air compressor when said signal reaches a second, predetermined value, corresponding to a second, predetermined threshold pressure, further comprising the step of recording data regarding operating characteristics of said air compressor.

15. The method for controlling an air compressor comprising:

sensing a pressure of a reservoir containing compressed air supplied by an air compressor;

generating a signal indicative of said pressure and transmitting said signal to a control means for controlling the air compressor;

activating said air compressor when said signal falls below a first predetermined value, corresponding to a first predetermined threshold pressure activating said air compressor when energy is available;

deactivating said air compressor when said signal reaches a second, predetermined value, corresponding to a second, predetermined threshold pressure, further comprising the step of detecting a compressor head temperature and deactivating said air compressor when a compressor head temperature above a predetermined threshold temperature is detected.

\* \* \* \* \*